(12) United States Patent
Murata et al.

(10) Patent No.: US 6,178,842 B1
(45) Date of Patent: Jan. 30, 2001

(54) INDUSTRIAL ROBOT

(75) Inventors: Yuji Murata; Isao Arai, both of Takaoka; Nobutaka Fukayama, Toyamaken; Kiyoshi Kanitani, Toyama, all of (JP)

(73) Assignee: Nachi-Fujikoshi Corp., Toyama (JP)

( * ) Notice: Under 35 U.S.C. 154(b), the term of this patent shall be extended for 0 days.

(21) Appl. No.: 09/197,667

(22) Filed: Nov. 23, 1998

(30) Foreign Application Priority Data

Nov. 25, 1997 (JP) .................................................. 9-338242

(51) Int. Cl.[7] ........................................................ B25J 9/06
(52) U.S. Cl. .................................... 74/490.01; 74/490.03; 901/50
(58) Field of Search ................................ 74/479.01, 490.01, 74/490.02, 490.03, 490.05; 901/19, 23, 27, 50

(56) References Cited

U.S. PATENT DOCUMENTS 5,375,480   12/1994   Nihei et al. .
5,697,255 * 12/1997   Miyamoto et al. ............... 74/490.01
5,983,744 * 11/1999   Watanabe et al. ............... 74/490.02

* cited by examiner

*Primary Examiner*—David Fenstermacher
(74) *Attorney, Agent, or Firm*—Venable; Gabor J. Kelemen

(57) ABSTRACT

An industrial robot is provided which has a compact and of low height body operable within an operating range not exceed the height of the robot during operation, and yet is able to secure a wide operating range of the near front side of the robot. The robot has a fixed base, a rotary base mounted on the fixed base rotatably around a vertical swing axis, a first arm mounted on the rotary base rotatably around a horizontal first rotational axis, a second arm mounted on the first arm rotatably around a horizontal second rotational axis and a wrist mounted on the distal end of the second arm rotatably around a longitudinal axis thereof. The first arm is made operable to hang down in a position where the axis of the first arm is perpendicular to the installation surface of the robot and outwardly offset from the outer surface of the fixed base, the operating range of the first arm which interfere with the fixed base is made so small and the operating range of the front side of the robot is much enlarged.

2 Claims, 5 Drawing Sheets

INDUSTRIAL ROBOT

BACKGROUND OF THE INVENTION

1. Field of the Invention

The present invention relates to a vertical articulated industrial robot, especially it relates to an industrial robot adapted to be able be installed very closely between other robots in a production line, having a small height substantially the same level that of works of the production line, and operable within an operating range not exceed the height of the robot during operation, and yet is able to secure a wide operating range including that in the near front side of the robot.

2. Description of the Related Art

A conventional vertical articulated industrial robot, for example, shown schematically in FIG. 4 is proposed which is able to be installed very between other robots in a production line and having a small height substantially the same level that of works of the production line. The height of this robot is made lower than that of the conventional robot. The robot has a fixed base 40, a rotary base 43 mounted on the fixed base rotatably around a vertical swing axis 47, a first arm 44 mounted on the rotary base 43 rotatably around a horizontal first rotational axis 41 closely located to the installation surface 48 of the robot and a second arm 45 mounted on the distal end of first arm 44 rotatably around a horizontal second rotational axis 42. A wrist 46 is mounted at a distal end of the second arm 45.

The robot shown in FIG. 4 has a considerably wide operating range 4A since (slant lines) or working envelop in the near front side as seen in side view. However, referring to FIG. 5, when the first arm 44 and the second arm 45 are folded together during operation, the folded portions projecting into the rear side of the robot forms a range B or space shown in FIG. 6 in a plan view which interfere with the ambient installations. This results that this type of robot is not suitable to be installed very closely between other robots in a production line. In FIG. 6, for easy explanation, the swing angles are expressed as limited within about 120 degrees, and 6A is an operating range of the front side.

To eliminate the interference range such as B shown in FIG. 6, U.S. Pat. No. 5,375,480, for example, discloses a robot shown in FIG. 7 in skeleton. This robot has a fixed base 71, a rotary base 72 mounted on the fixed base rotatably around a vertical swing axis 78, a first arm 73 mounted on the rotary base 72 rotatably around a horizontal first rotational axis 76 located on the outer end of the rotary base 72 positioned substantially above the outer surface of the fixed base 71 and a second arm 74 mounted on the distal end of the first arm 73 rotatably around a horizontal second rotational axis 77. A wrist 75 is mounted at the distal end of the second arm 74. Although the robot shown in FIG. 7 can eliminate the interference range such as shown in FIG. 6, it is however, unable to have a considerably wide operating range 4A as been shown in FIG. 4.

SUMMARY OF THE INVENTION

It is therefore an object of the present invention to provide an improved industrial robot which is able to be installed very closely between the other robots in a production line in order to shorten the production line.

Another object of the present invention is to provide an improved industrial robot having a small height at substantially the same level that as of works of the production line, and operable within an operating range not to exceed the height of the robot during operation, and yet is able to secure a wide operating range including that in the near front side of the robot.

A further object of the present invention is to provide an improved industrial robot which can eliminate a rear side interference range which may interfere with the other ambient robots when its arms are folded together during operation.

According to the first invention of the present invention, the above and other objects can be accomplished by an industrial robot come above and other objects can be accomplished by an industrial robot comprising: a fixed base mounted on an installation surface at a predetermined height therefrom, a rotary base mounted on the fixed base rotatably around a vertical swing axis perpendicular to the installation surface and having a projecting portion which offsets from and projects outward from an outer surface of the fixed base, a first arm mounted on the projecting portion of the rotary base rotatably around a substantially horizontal first rotational axis parallel to the installation surface, a second arm mounted on the distal end of the first arm rotatably around a substantially horizontal second rotational axis parallel to the first rotational axis, and a wrist mounted on the distal end of the second arm rotatably around a longitudinal axis of the second arm, wherein the longitudinal length of the first arm is made smaller than that of between the first rotational axis and the installation surface, and the first arm is made operable to hang down from the first rotational axis in a position where the axis of the first arm is substantially perpendicular to the installation surface.

By such an arrangement, since the first arm is made operable to hang down in a position perpendicular to the installation surface of the robot and outwardly offset from the outer surface of the fixed base, an interference range of the first arm which interfere with the fixed base is made so small, resulting in the operating range of the front side of the robot being much enlarged. This results in the robot being able to be installed very closely between the other robots in a production line in order to shorten the production line, and to have a small height substantially the same level that of works of the production line, and yet is able to secure a wide operating range including that of in the near front side of the robot. Further, a rear side interference range of the robot which interfere with the other robot in the production line causing out of the projecting portion of its arms when they are folded together during operation is eliminated.

According to the second invention of the present invention, there is provided an industrial robot comprising: a rotary base mounted on a fixed base rotatably around a vertical swing axis, an L-shaped first arm mounted on the rotary base rotatably around a substantially horizontal first rotational axis and having a curved portion curved toward the installation surface and a perpendicularly hanging down portion extending from the curved portion, a second arm mounted on the first arm and rotatable around a substantially horizontal second rotational axis outwardly offset from an outer surface of the fixed base, and a wrist mounted on the distal end of the second arm rotatably around a longitudinal axis of the second arm, wherein the longitudinal length of the perpendicular ingredient of the first arm is made smaller than that of between the first rotational axis and the installation surface.

By such an arrangement, the second invention of the present invention performs similar effects to that of the above described with reference to the first invention. Besides, since the first rotational axis is located within the outer surface of the fixed base, the radius of the gyration between the vertical swing axis and the end of the wrist mounted on the second arm can be made small, resulting that an interfere range which interfere with the ambient installations may be made small.

The longitudinal axis of the second arm is offset from the second rotational axis toward the first rotational axis, thereby resulting in that when the distal end of the first arm or the second rotational axis is operated to position very closely to the installation surface, added parts to second arms, such as motors/reduction gears for drive the wrist and which have very large outer contours do not interfere with the installation surface. Thus, in the design stage of the robot, the length of the first arm may be designed to reach closely to the installation surface, and also in operation, the distal end of the first arm may be operated closely to the installation surface thereby enlarges its operating range widely on the front side of the robot.

According to the third invention of the present invention, there is provided an industrial robot comprising: a fixed base mounted on an installation surface at a predetermined height therefrom, a rotary base mounted on the fixed base rotatably around a vertical swing axis perpendicular to the installation surface, a first arm mounted on the rotary base rotatably around a substantially horizontal first rotational axis, a second arm mounted on the distal end of the first arm and rotatable around a substantially horizontal second rotational axis parallel to the first rotational axis, and a wrist mounted on the distal end of the second arm rotatably around a longitudinal axis of the second arm, wherein the longitudinal length of the perpendicular ingredient of the first arm is made smaller than that of between the first rotational axis and the installation surface, and the longitudinal axis of the second arm is offset from the second rotational axis toward the first rotational axis.

By such an arrangement, the distal end of the first arm or the second rotational axis may be operated to position very closely to the installation surface, added parts to the second arms, such as motors/reduction gears to drive the wrist and which have very large outer contours do not interfere with the installation surface. Thus, in the design stage of the robot, the longitudinal length of the first arm may be designed to reach closely to the installation surface, and in operation, the distal end of the first arm may be operated closely to the installation surface thereby enlarges its operating range widely on the front side of the robot. Further, a rear side interference range of the robot which interfere with the other robot in the production line causing out of the projecting portion of its arms when they are folded together during operation is eliminated.

More preferably, the second rotational axis is made to locate within a range not exceed the height of the first rotational axis so that the first arm, the second arm and the wrist are so configured as to be operable within an operating range not exceed the height of the top of the rotary base. Thereby enables to have a very limited operating range not exceed the height lever of the top of the rotary base in operation.

DETAILED DESCRIPTION OF THE PREFERRED EMBODIMENTS

Figure 1:
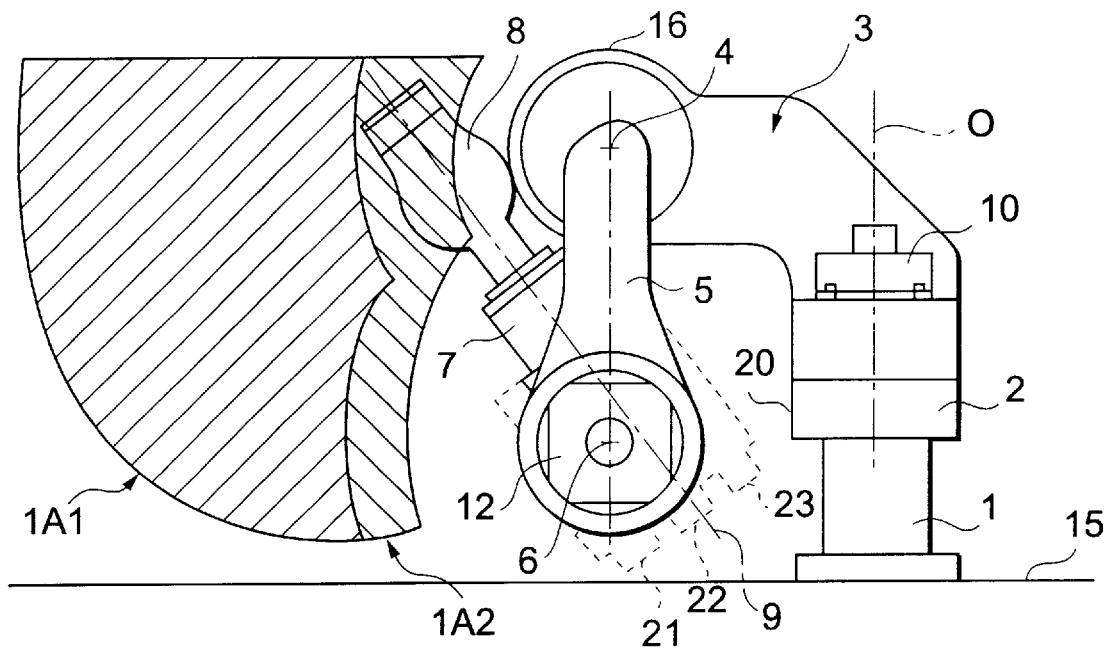
FIG. 1 is a side schematic elevational view of the first preferred embodiment of the first invention of the present invention.

Referring to the drawings, particularly to FIG. 1, there is schematically shown an industrial robot of the first preferred embodiment of the first invention of the present invention. The robot comprises a fixed base 2 fixed on a mounting pedestal 1 having a predetermined height from the installation surface 15. In place of the mounting pedestal 1, the fixed base 2 may be made longer by the length of the mounting pedestal to have the predetermined height. A rotary base 3 is mounted on the fixed base 2 rotatably around a vertical swing axis O perpendicular to the installation surface 15 and driven by a motor/reduction gear unit 10. The rotary base 3 has a projecting portion 16 offset from and outwardly projecting from an outer surface 20 of the fixed base 2. A first arm 5 is mounted on the projecting portion 16 of the rotary base 3 rotatable around a substantially horizontal first rotational axis 4 parallel to the installation surface 15. The first arm 5 is rotated by a motor/reduction gear unit disposed on the right side of the rotary base 3 (the back side of FIG. 1—not shown). Further, the first arm 5 is made operable to hang down from the first rotational axis 4 in a position substantially perpendicular to the installation surface 15, and the longitudinal length of the first arm 5 is made smaller than that of between the first rotational axis 4 and the installation surface 15. Thus the first arm 5 is made operable to hang down in a position substantially perpendicular to the installation surface 15 without possibility to interfere with the mounting pedestal 1, the fixed base 2, the rotary base 3 and the installation surface 15.

A second arm 7 is mounted on the distal end of the first arm 5 rotatably around a substantially horizontal second rotational axis 6 parallel to the first rotational axis 4, and a wrist 8 is mounted on the distal end of the second arm 5 rotatably around a longitudinal axis 9 of the second arm 7. The second arm 7 is rotated by a motor/reduction gear unit 12 disposed on the second rotational axis 6. The wrist 8 has a three degree freedom (two of them are not shown). The longitudinal length between the distal end of the wrist 8 and the second rotational axis 6 is made substantially the same as that of between the top of the rotary base 3 and the second rotational axis 6.

Figure 6:
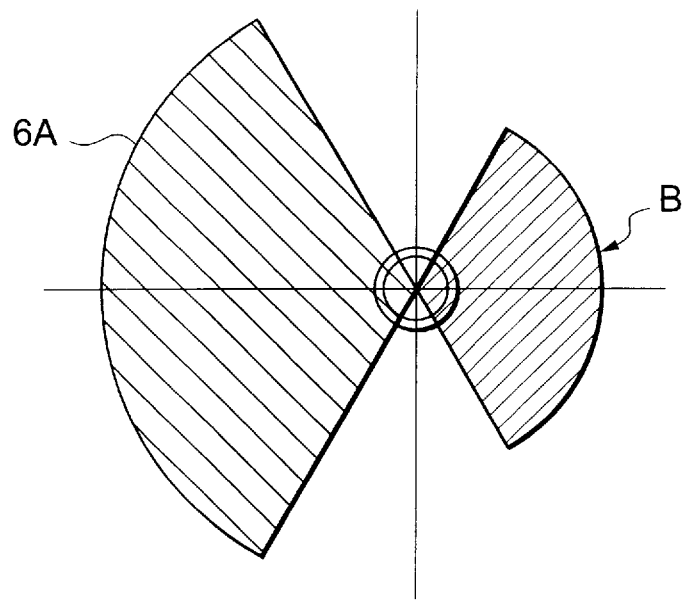
FIG. 6 is a reduced plan view of the industrial robot shown in FIG. 5 when the first and second arms are swung around about 180 degree.

By such an arrangement, the robot of FIG. 1 results in the robot being able to be installed very closely between the other robots in a production line in order to shorten the production line, and to have a small height at substantially the same level as that of works of the production line, and yet is able to secure a wide operating range including that of in the near front side of the robot. Further, a rear side interference range of the robot such as B shown in FIG. 6 which interfere with the other robot in a production line causing out of the projecting portion of its arms when they are folded together during operation is eliminated.

The second rotational axis 6 is operated so that it is made to locate within a range not exceed the height of the first rotational axis 4, thereby the first arm 5, the second arm 7 and the wrist 8 are so configured as to be operable within an operating range not exceed the height of the top of the rotary base 2, resulting that it is enabled to have a very limited operating range not exceed the height level of the top of the rotary base 3 in operation.

In FIG. 1, the longitudinal axis 9 of the second arm 7 is offset from the second rotational axis 6 toward the first rotational axis 4. By this arrangement, the distal end of the first arm 5 or the second rotational axis 6 may be operated to position very closely to the installation surface 15, added parts to the second arm 7, such as motors/reduction gears 21,22,23 to drive the wrist shown in dotted lines which have very large outer contours do not interfere with the installation surface 15. Thus, in the design stage of the robot, the longitudinal length of the first arm 5 may be designed to reach closely to the installation surface 15, and in operation, the distal end of the first arm 5 may be operated closely to the installation surface 15, which thus enlarges its operating range 1A2 widely on the front near side of the robot. The robot of the first preferred embodiment of the first invention shown in FIG. 1 is operated by a robot controller not shown, and has operating ranges 1A1 plus 1A2 (slant lines) or working envelop. The operating range 1A1 is that in the case where the wrist rotational axis 9 is not offset from the second rotational axis 6 toward the first rotational axis 4, and that of 1A2 is an enlarged operating range by such offsetting. Since motors/reduction gears 21,22,23 have excessively large outer contours compared to the outer diameter of the second arm 7, the enlarged operating range 1A2 by the offsetting is considerably large.

Figure 10:
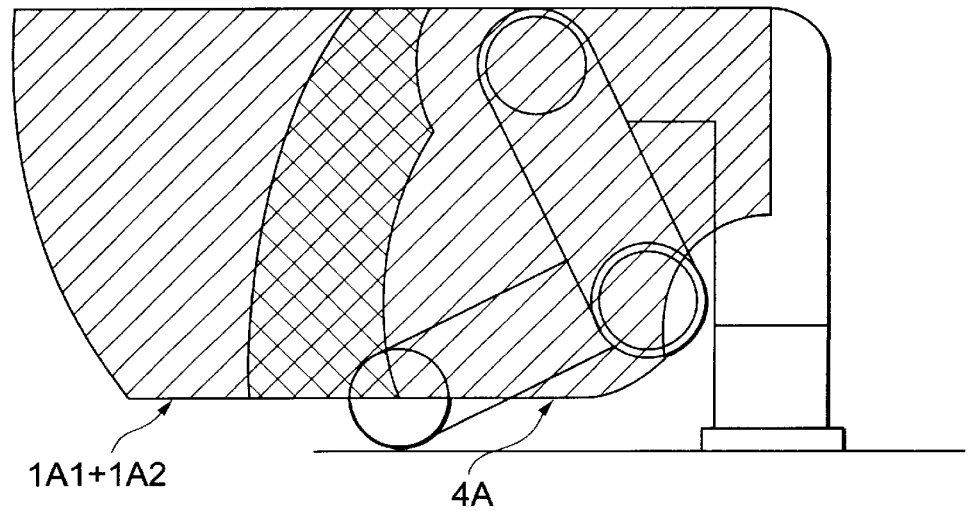
FIG. 10 is a comparison side view illustrating a superimposed operating range 4A shown in FIG. 4 on that 1A1+1A2 of FIG. 1.
Figure 4:
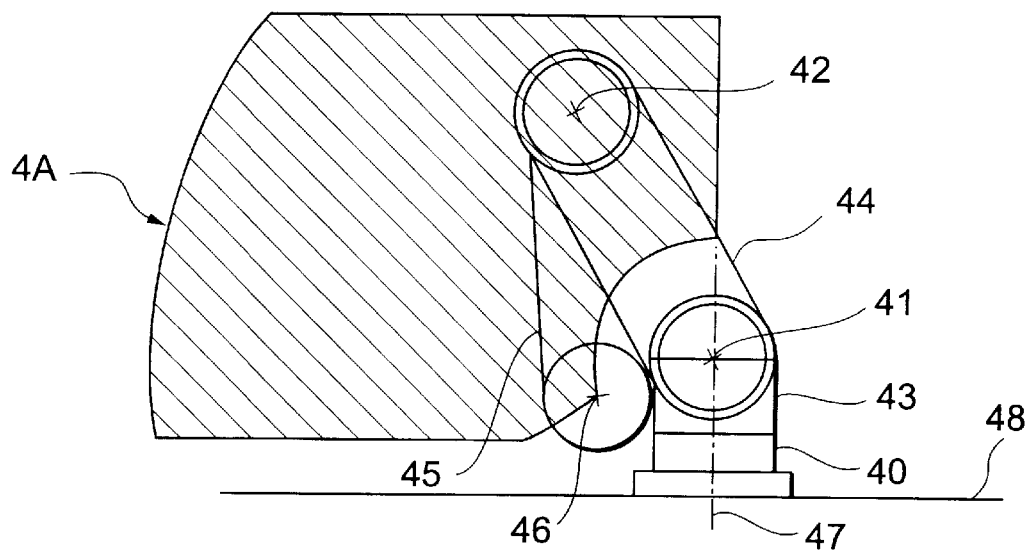
FIG. 4 is a side schematic elevational view of a conventional vertical articulated industrial robot having a low height.
Figure 5:
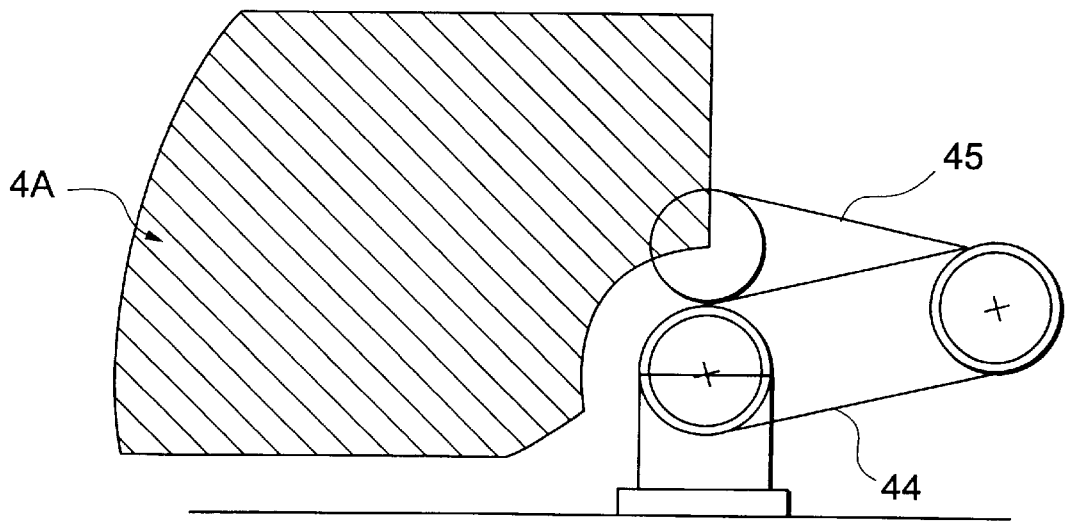
FIG. 5 is a side elevational view of the industrial robot shown in FIG. 4 when its first and second arms are folded together.
Figure 9:
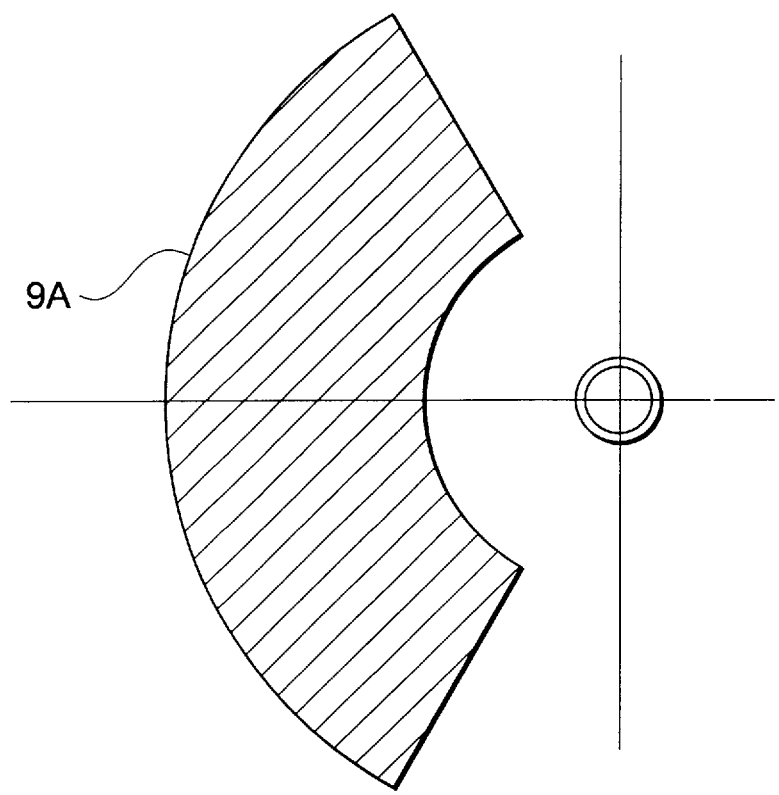
FIG. 9 is a reduced plan view of the operating range of the industrial robot shown in FIG. 1 when the first and second arms are swung around about 180 degree.

The arrangement of FIG. 1 enlarges the operating range 1A1 plus 1A2 of robot large enough toward the installation surface side, and thereby enables to have a very wide operating range of the first arm 5, the second arm 7 and the wrist 8 covering from the installation surface 15 to the height level of the top of the rotary base 3 in operation. For the convenience of description, the operating ranges 1A1 and 1A2 shown in Fig.,P are illustrated so that the first arm 5, the second arm 7 and the wrist 8 are controlled not to extend above the top of the rotary base 3 by the robot controller not shown. However, in practice these arm members of the robot may be operated above the top of the rotary base 3. FIG. 9 is a reduced plan view of the operating range 9 A or an interference area of the industrial robot shown in FIG. 1 when the first and second arms are swung around about 180 degree, and FIG. 10 is a comparison side view illustrating a superimposed operating range 4A shown in FIG. 4 on that 1A1+1A2 of FIG. 1.

Figure 2:
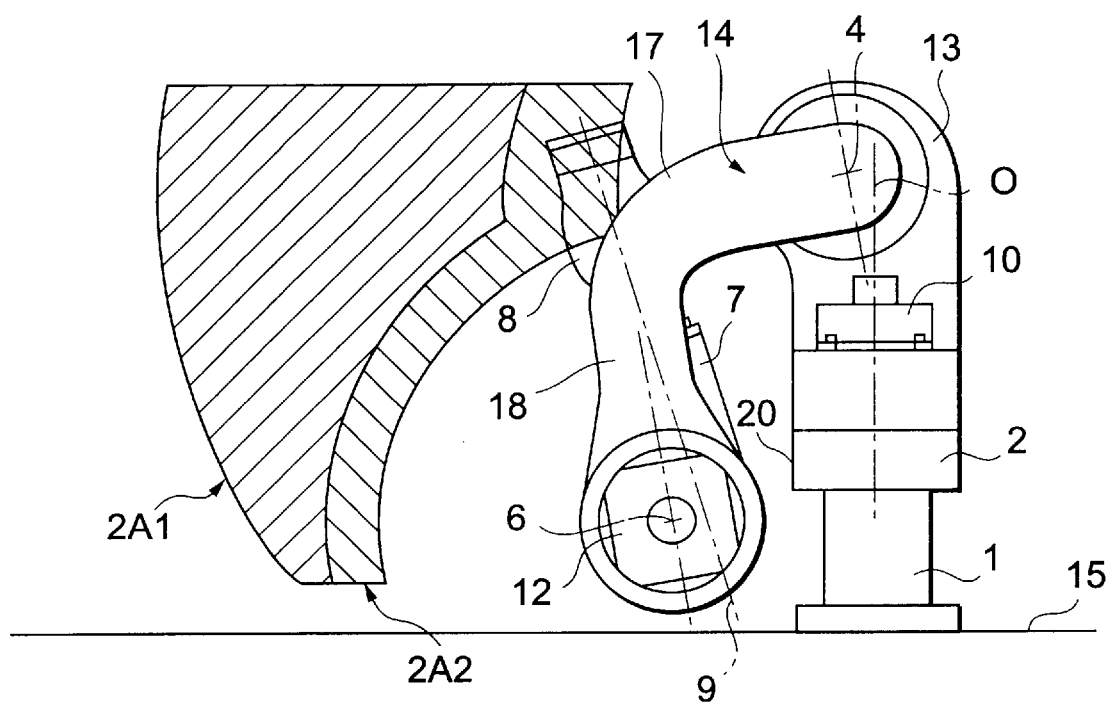
FIG. 2 is a side schematic elevational view of the second preferred embodiment of the second invention of the present invention.

Referring to FIG. 2, there is shown schematically an industrial robot of the second preferred embodiment of the second invention of the present invention. Like parts as those of the embodiment shown 1 will be assigned like reference numerals and the description thereof will be partly omitted. The robot comprises a fixed base 2 fixed on a mounting pedestal 1 having a predetermined height from a installation surface 15. A rotary base 3 is mounted on the fixed base 2 rotatably around a vertical swing axis O. A substantially horizontal first rotational axis 4 parallel to the installation surface 15 is disposed on the rotary base 13 at its interior located in a position not projecting outwardly beyond the outer surface 20 of the fixed base 2.

An L-shaped first arm 14 mounted on the rotary base 13 rotatably around the horizontal first rotational axis 4 and having a curved portion 17 curved toward the installation surface 15 and a perpendicularly hanging down portion 18 extending from the curved portion 17. The first arm 14 is rotated by a motor/reduction gear unit disposed on the right side of the rotary base 13 (not shown). Further, the perpendicularly hanging down portion 18 of the first arm 14 is made operable to hang down in a position substantially perpendicularly to the installation surface 15, and the length of the perpendicular portion of the first arm 5 is made smaller than that of between the first rotational axis 4 and the installation surface 15. By this curved L-shaped first arm 14, the first rotational axis 4 is able to be located within the interior of the outer surface 20 of the fixed base 2.

A second arm 7 is mounted on the distal end of the perpendicularly hanging down portion 18 of the first arm 14 and is rotatable around a substantially horizontal second rotational axis 6 parallel to the first rotational axis 4 outwardly offset from the outer surface of the fixed base 2. A wrist 8 is mounted on the distal end of the second arm 7 rotatably around a longitudinal axis 9 of the second arm 7. Also in FIG. 2, the longitudinal axis 9 of the second arm 7 is made to offset from the second rotational axis 6 toward the first rotational axis 4. The longitudinal length between the distal end of the wrist 8 and the second rotational axis 6 is made substantially the same as the length of the perpendicular portion between the top of the rotary base 13 and the second rotational axis 6. The second rotational axis 6 is made to be located within a range not exceed the height of the first rotational axis 4 so that the first arm 5, the second arm 14 and the wrist 8 are so configured as to be operable within an operating range not exceed the height of the top of the rotary base 13, which thereby enables it to have a very limited operating range not exceed the height level of the top of the rotary base 13 in operation.

Figure 7:
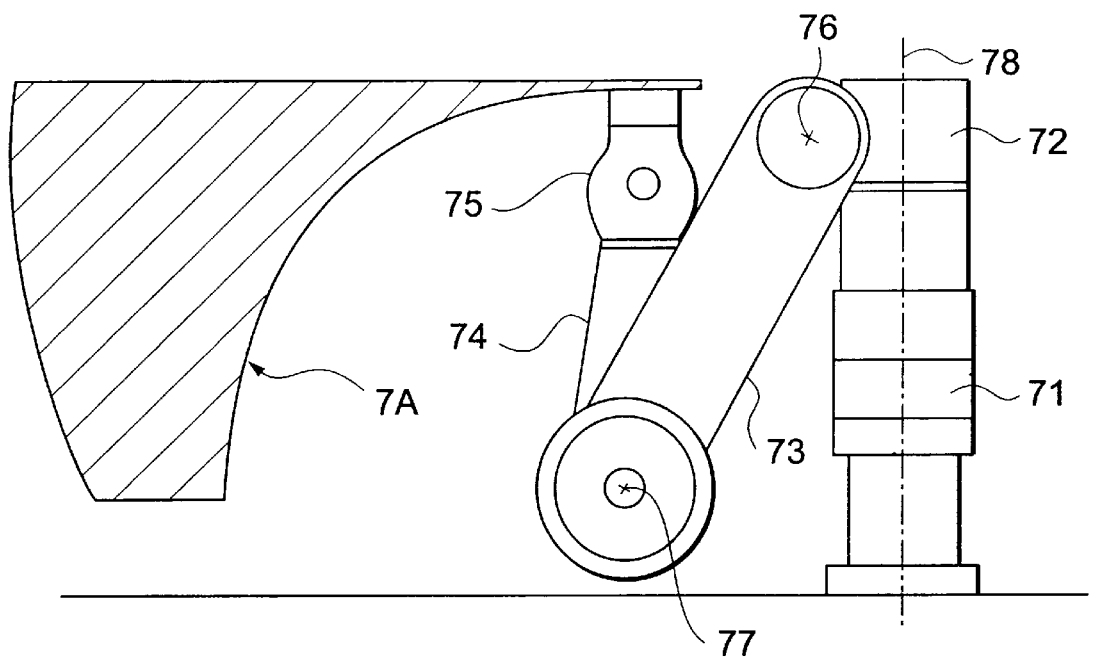
FIG. 7 is a side schematic elevational view of another conventional industrial robot in which its first horizontal axis of the first arm is located on the outer end of its rotary base.
Figure 8:
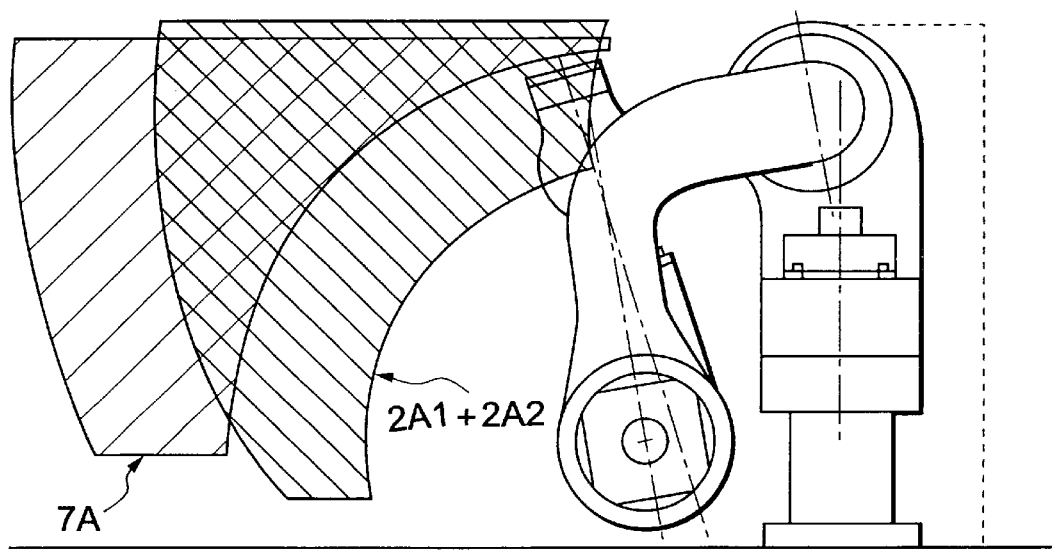
FIG. 8 is a comparison side view illustrating a superimposed operating range 7A shown in FIG. 7 on that 2A1+2A2 of FIG. 2.

By the arrangement of FIG. 2, the second embodiment performs similar effects to that of the above explained with reference to FIG. 1 for the first embodiment of the first invention. Besides, since the first rotational axis 4 is located within the outer surface 20 of the fixed base 2, the radius of the gyration between the vertical swing axis O and the end of the wrist 8 mounted on the second arm 7 can be made small, resulting that an interference range which interfere with the ambient installations may be made small. Similar to FIG. 1, the operating range 2A1 is that of when the longitudinal axis 9 of the second arm 7 is not made to offset from the second rotational axis 6 toward the first rotational axis 4, and that of 2A2 is an enlarged operating range by such offsetting. Further, for the convenience of description, the operating ranges 1A1 and 1A2 shown in FIG. 1 are illustrated so that the first arm 14, the second arm 7 and the wrist 8 are controlled not to extend above the top of the rotary base 13 by a robot controller not shown. FIG. 8 is a comparison side view illustrating a superimposed operating range 7 A shown in FIG. 7 on that 2A1+2A2 of FIG. 2.

Figure 3:
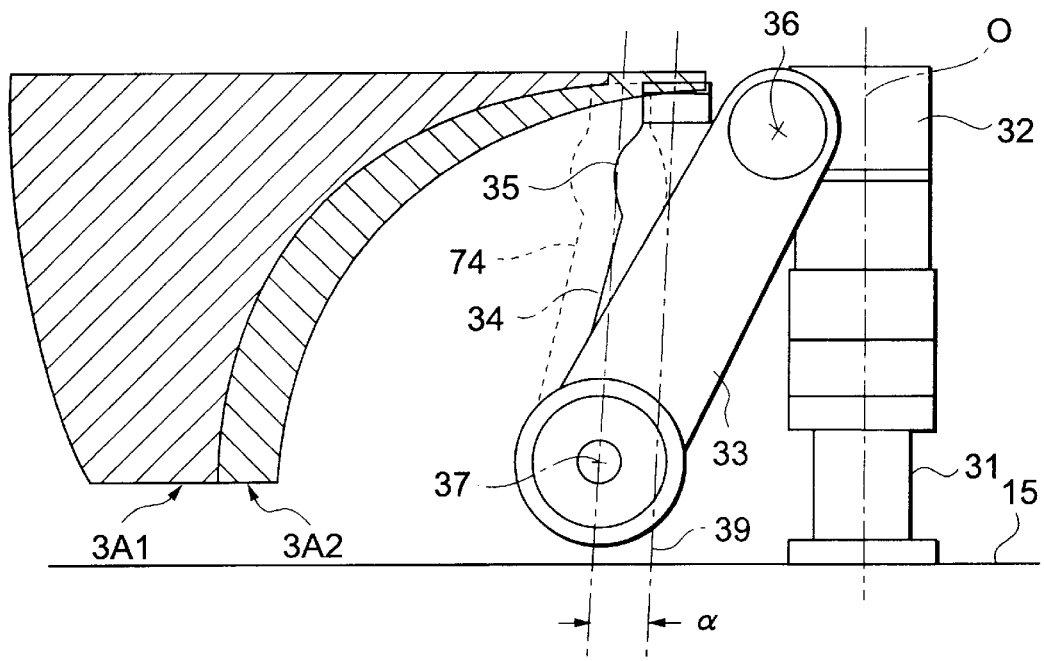
FIG. 3 is a side schematic elevational view of the third preferred embodiment of the third invention of the present invention.

Referring to FIG. 3, there is shown schematically an industrial robot of the third preferred embodiment of the third invention of the present invention. The robot comprises a fixed base 31 having a predetermined height and mounted directly on a installation surface 15, a rotary base 32 mounted on the fixed base 31 rotatably around a vertical swing axis O perpendicular to the installation surface 15, a first arm 33 mounted on the rotary base 32 rotatably around a substantially horizontal first rotational axis 36, a second arm 34 mounted on the distal end of the first arm 33 and rotatable around a substantially horizontal second rotational axis 37 parallel to the first rotational axis 36, and a wrist 35 mounted on the distal end of the second arm 34 rotatably around a longitudinal axis 39 of the second arm 34. The length of the perpendicular ingredient of the first arm 33 is made smaller than that of between the first rotational axis 36 and the installation surface 15, and the longitudinal axis 39 of the second arm 34 is offset from the second rotational axis 37 toward the first rotational axis 36. The length between the distal end of the wrist 35 and the second rotational axis 37 is made substantially the same as the length of the perpendicular ingredient between the top of the rotary base 32 and the second rotational axis 37. The second rotational axis 37 is made to locate within a range not exceed the height of the first rotational axis 36 so that the first arm 33 the second arm 34 and the wrist 35 are so configured as to be operable within an operating range not exceed the height of the top of the rotary base 32, which thereby enables it to have a very limited operating range not exceed the height level of the top of the rotary base 32 in operation.

By the arrangement of FIG. 3, the distal end of the first arm 33 or the second rotational axis 37 may be operated to position very closely to the installation surface 15, added parts to the second arm 34, such as motors/reduction gears to drive the wrist as illustrated in FIG. 1 (not shown) which have very large outer contours compared to the outer diameter of the second arm 34 do not interfere with the installation surface 15. In FIG. 3, in the operating ranges 3A1 plus 3A2 (slant lines), the operating ranges 3A1 is that of when the wrist rotational axis 39 is not offset from the second rotational axis 37 toward the first rotational axis 36, and that of 3A2 is an enlarged operating range by such offsetting. Since the motors/reduction gears (not shown) have excessively large outer contours compared to the outer diameter of the second arm 34, the enlarged operating range 3A2 by the offsetting is considerably large. Thus, in the design stage of the robot, the longitudinal length of the first arm 33 may be designed to reach closely to the installation surface 15, and also in operation, the distal end of the first arm 33 may be operated closely to the installation surface 15 enlarging its operating range 3A1 plus 3A2 widely on the front side of the robot. Further, a rear side interference range such as shown B in FIG. 6 of the robot which interfere with the other robot in the production line causing out of the projecting portion of its arms when they are folded together during operation is eliminated. Dotted lines 74 show a contour of the second arm 74 of FIG. 7, and the operating ranges 3A1 is illustrated the same as that of FIG. 7.

The present invention has been described by way of example, however, the present invention may be embodied in other specific forms without departing from the spirit thereof, and those other specific forms are therefore intended to be embraced therein.

What is claimed is:

1. An industrial robot comprising:

a fixed base mounted on an installation surface at a predetermined height therefrom, a rotary base mounted on the fixed base rotatably around a vertical swing axis perpendicular to the installation surface and having a projecting portion which offsets from and projects outward from an outer surface of the fixed base, a first arm mounted on the projecting portion of the rotary base rotatably around a substantially horizontal first rotational axis parallel to the installation surface and having a distal end, a first longitudinal axis and a first longitudinal length, a second arm mounted on the distal end of the first arm rotatably around a substantially horizontal second rotational axis parallel to the first rotational axis and having a second longitudinal axis, and a wrist mounted on the distal end of the second arm rotatably around a second longitudinal axis of the second arm, wherein the first longitudinal length of the first arm is smaller than a distance between the first rotational axis and the installation surface, and the first arm is made operable to hang down from the first rotational axis in a position where the first longitudinal axis of the first arm is substantially perpendicular to the installation surface, and wherein a longitudinal axis of the second arm is offset from the second rotational axis in a direction toward the first rotational axis.

2. The industrial robot of claim 1 in which the second rotational axis is located within a range not to exceed the height of the first rotational axis and the first arm, the second arm and the wrist are operable to remain located within an operating range not to exceed the height of the top of the rotary base during operation.

* * * * *